(12) United States Patent
Srikanteswara et al.

(10) Patent No.: US 8,958,813 B2
(45) Date of Patent: *Feb. 17, 2015

(54) CLOUD-BASED SPECTRUM MANAGEMENT SERVICES

(75) Inventors: Srikathyayani Srikanteswara, Portland, OR (US); Carlos Cordeiro, Portland, OR (US); Bahareh Sadeghi, Portland, OR (US); Reza Arefi, Great Falls, VA (US); Geoff O. Weaver, Portland, OR (US); David M. Horne, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 274 days.

This patent is subject to a terminal disclaimer.

(21) Appl. No.: 13/538,183

(22) Filed: Jun. 29, 2012

(65) Prior Publication Data

US 2013/0273958 A1    Oct. 17, 2013

Related U.S. Application Data

(60) Provisional application No. 61/603,261, filed on Apr. 11, 2012.

(51) Int. Cl.
| | |
|---|---|
| *H04W 16/14* | (2009.01) |
| *H04W 4/24* | (2009.01) |
| *H04W 72/04* | (2009.01) |
| *H04W 24/08* | (2009.01) |
| *H04W 28/16* | (2009.01) |

(52) U.S. Cl.
CPC ............... *H04W 4/24* (2013.01); *H04W 16/14* (2013.01); *H04W 72/04* (2013.01); *H04W 24/08* (2013.01); *H04W 72/0486* (2013.01); *H04W 72/0493* (2013.01); *H04W 28/16* (2013.01)

USPC ........ 455/454; 455/452.1; 455/450; 455/509; 455/552.1; 455/409

(58) Field of Classification Search
CPC ..... H04W 16/14; H04W 16/18; H04W 28/00; H04W 28/02; H04W 28/16; H04W 72/00; H04W 28/005; H04W 28/04; H04W 28/12
USPC ........... 455/514, 509, 452.1, 454, 406, 552.1, 455/450, 418, 411, 409, 464; 705/37, 1; 706/12; 707/609
See application file for complete search history.

(56) References Cited

U.S. PATENT DOCUMENTS

| | | | | |
|---|---|---|---|---|
| 2006/0143111 | A1* | 6/2006 | Mylet | 705/37 |
| 2008/0222019 | A1* | 9/2008 | Stanforth et al. | 705/37 |
| 2013/0196677 | A1* | 8/2013 | Smith et al. | 455/452.1 |
| 2013/0273881 | A1* | 10/2013 | Sadeghi et al. | 455/406 |
| 2013/0273933 | A1* | 10/2013 | Sadeghi et al. | 455/454 |
| 2013/0273953 | A1* | 10/2013 | Srikanteswara et al. | 455/509 |
| 2013/0275346 | A1* | 10/2013 | Srikanteswara et al. | 706/12 |

* cited by examiner

*Primary Examiner* — Tan Trinh
(74) *Attorney, Agent, or Firm* — PRASS LLP; Ellis B. Ramirez

(57) ABSTRACT

A platform to facilitate transferring spectrum use rights is provided that includes a database to ascertain information regarding available spectrum for use in wireless communications. A request for spectrum use from an entity needing spectrum may be matched with available spectrum. The Cloud Spectrum Services (CSS) process allows entities to access spectrum they would otherwise not have; it allows the end user to complete their download during congested periods while maintaining high service quality; and it allows the holder of rental spectrum to receive compensation for an otherwise idle asset.

20 Claims, 5 Drawing Sheets

CLOUD-BASED SPECTRUM MANAGEMENT SERVICES

CROSS-REFERENCES TO RELATED APPLICATIONS

This application claims priority to U.S. Provisional Application No. 61/603,261 entitled "INTELLIGENT SPECTRUM ALLOCATION BASED ON USER BEHAVIOR PATTERNS FOR EFFICIENT SPECTRUM USAGE," filed Feb. 25, 2012, the entire disclosure of which is incorporated herein by reference in its entirety.

BACKGROUND

1. Field of the Disclosed Embodiments

The present invention relates generally to wireless communications and more particularly to a system and method for dynamically renting spectrum for mobile broadband applications.

2. Introduction

The world is headed to a global spectrum shortage triggered by the wireless data explosion. New digital and wireless technologies, inclusive of cell phones, satellites, and high-definition television, are dramatically changing how people use the airwaves. Since the early days of radio and telegraph transmission, the available radio spectrum in the United States and other jurisdictions has been carved up by regulatory agencies into discrete bands or channels. Use of spectrum bands has been restricted to certain types of users or certain licensees. Availability of wireless spectrum for the plethora of mobile devices is key to the continued use of the spectrum to exchange data or content. Exclusive mobile broadband licenses are near exhaustion and the discussion in the industry has already moved from spectrum sale to spectrum rental. There is a worldwide push for regulations that allow licensed spectrum holders to rent their un-used or under utilized spectrum to other entities with a desire to use the spectrum. This creates a win-win situation where, for example mobile operators get access to spectrum they otherwise would not have, while the spectrum holders with un-used spectrum get some form of compensation. This is particularly attractive to the licensed spectrum holders (non-cellular) who may be underutilizing their spectrum but cannot relinquish the spectrum (say by selling it in the secondary market) since they have use for it in certain areas or certain times. The disclosed embodiment proposes a cloud based spectrum management scheme that enables dynamic spectrum rentals with optimum spectrum allocation.

Some of the suggested industry solutions use spectrum sensing by the client to detect un-used spectrum and to allocate using utility models based on fairness, content type, and differences in the provider. These suggested solutions would create fragmentation and lead to inefficiencies that would only exacerbate the current problems. The primary spectrum holders who rent their spectrum out usually have two main requirements: First, they need to be able to regain control of their spectrum when they need it and there needs to be a clear mechanism for this. Second, they like to be in control of what portion of their spectrum gets rented. The spectrum sensing solution does not meet these requirements since the client device that detects available spectrum would not be under the control of the primary spectrum holder. Other suggested solutions include use of a cognitive pilot channel (wireless spectrum) to advertise available un-used spectrum, which in turn uses more spectrum. Use of static databases to locate unused spectrum is also common when information does not change for at least 24 hours. Explicit techniques for dynamic cloud based spectrum management for optimal spectrum utilization is currently unavailable.

SOME EXAMPLE EMBODIMENTS

Therefore, there is a need for an approach for managing dynamic sharing of available spectrum services. In these embodiments there is proposed the use of the cloud to manage and optimize the complex transactions associated with dynamic spectrum sharing. A centralized access of the cloud enables better operational effectiveness as all client devices will be cloud connected, and able to instantaneously cease usage of the shared spectrum when a spectrum holder signals its need for access.

According to one embodiment, A dynamic cloud based spectrum management platform, comprising a database operable to store information associated with at least one spectrum asset, wherein the stored information includes dynamic spectrum availability from spectrum holders advertising their spectrum for rent, wherein the database is further operable to apportion the spectrum for rent in response to a request for spectrum from a user.

According to another embodiment, a method to allocate spectrum, comprising maintaining a database operable to store information associated with at least one spectrum asset, wherein the stored information includes dynamic spectrum availability from spectrum holders advertising their spectrum for rent; apportioning the spectrum for rent in response to a request for spectrum from a user.

According to another embodiment, a non-transitory machine-accessible medium that provides instructions, which when accessed, cause a machine to perform operations comprising maintaining a database operable to store information associated with at least one spectrum asset, wherein the stored information includes dynamic spectrum availability from spectrum holders advertising their spectrum for rent; apportioning the spectrum for rent in response to a request for spectrum from a user.

Exemplary embodiments are described herein. It is envisioned, however, that any system that incorporates features of any apparatus, method and/or system described herein are encompassed by the scope and spirit of the exemplary embodiments.

DETAILED DESCRIPTION OF THE DISCLOSED EMBODIMENTS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
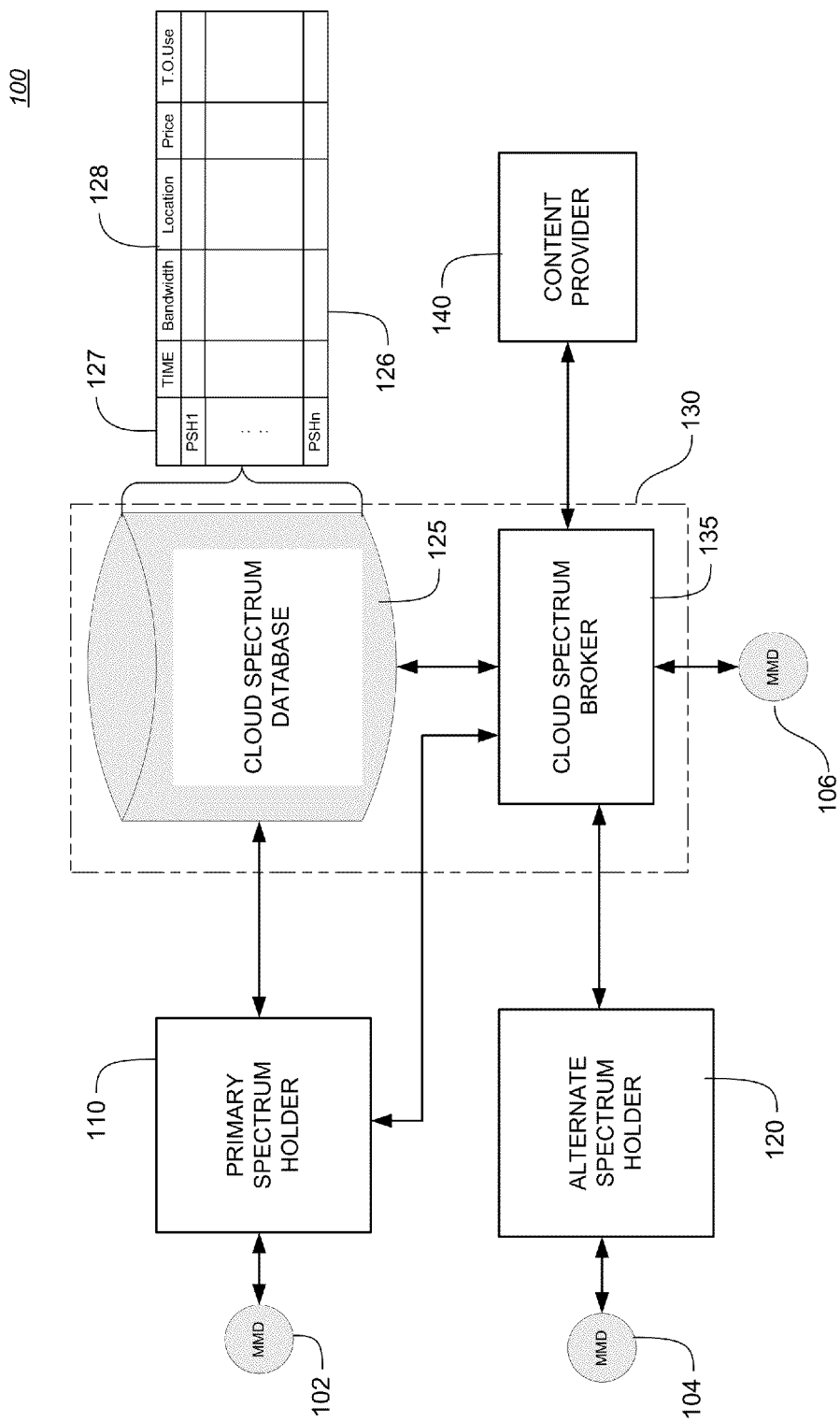
FIG. 1 illustrates the overall architecture of a cloud spectrum service system in accordance to an embodiment of the invention.

Additional features and advantages of the disclosure will be set forth in the description which follows, and in part will be obvious from the description, or may be learned by practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth herein.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Although embodiments of the invention are not limited in this regard, discussions utilizing terms such as, for example, "processing," "computing," "calculating," "determining," "applying," "receiving," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of resistors" may include two or more resistors.

The term "spectrum asset" is a right to use, usually in a specific geographic area, a range of electromagnetic radiation, from the highest frequency to the lowest. The spectrum encompasses everything from X-rays and gamma rays to visible light and radio waves. Additionally, the spectrum asset can be reduced to a set of time slots selected from a group consisting of hours, days, time blocks, minutes, and seconds or to a frequency range that is also reducible to a set of time slots.

The term "Cloud Spectrum Services (CSS)" is used herein to refer to a dynamic spectrum rental scheme that uses a cloud-based database and optimization engine to allocate available spectrum to client devices.

The term "Multi-mode device (MMD)" is used herein to primarily refer to a wireless device to transmit and/or receive data to/from a fixed network infrastructure, and includes for example a mobile device, tablet, computing device, TV sets, hand held (HH) device. An MMD could also be capable of directly using spectrum resources assigned by a Cloud Spectrum Broker CSB. An MMD can engage in wired or wireless communication with other devices.

As used herein the terms "lease" and "rent" are synonymous.

The term "Primary Spectrum Holder (PSH)", in the context of a cloud spectrum services (CSS) transaction, is a spectrum owner with rights conveyed by a regulatory authority to a portion of the radio spectrum that will be dynamically managed by a CSB and reallocated for temporary use to MMDs and/or Alternate Spectrum Holders (ASHs). Examples include TV broadcasters, cellular operators, and government agencies (military, public safety, and the like).

The term "Alternate Spectrum Holder (ASH)" as used herein is any entity which provides MMDs with access to a fixed network infrastructure. Examples include cellular operators and government agencies. In Cloud Spectrum Services (CSS) an ASH is a user that can request spectrum from a cloud spectrum broker.

The term "Cloud Spectrum Database (CSD)" is used herein to refer to a device to Store data that are used by a CSB to dynamically manage the spectrum asset such as a radio spectrum resource, i.e., spectrum availability at a given time in a given location. The CSD can be deployed by a third party or as part of an ASH or PSH network.

The term "Content Provider (CP)" is used herein to refer to Content providers such as ESPN, Netflix, Hulu, Disney and Amazon. A CP may establish service agreements directly with MMDs and uses the services of a CSB to ensure reliable delivery of content to MMDs across any communication infrastructure such as wireless media. In Cloud Spectrum Services (CSS) a CP is a user that can request spectrum from a cloud spectrum broker.

The term "Cloud Spectrum Broker (CSB)" refers to the entity responsible for managing CSS transactions and for optimizing the use of the spectrum asset like a radio spectrum resource across a geographical area on the basis of parameters such as PSH offerings, ASH requirements and requests, MMD capabilities and requests, CP offerings and requirements, and application requirements.

The term "controller" is used herein generally to describe various apparatus relating to the operation of one or more device that directs or regulates a process or machine. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

The term "wireless device" as used herein includes, for example, a device capable of wireless communication, a communication device capable of wireless communication, a communication station capable of wireless communication, a portable or non-portable device capable of wireless communication, or the like. In some embodiments, a wireless device may be or may include a peripheral device that is integrated with a computer, or a peripheral device that is attached to a computer. In some embodiments, the term "wireless device" may optionally include a wireless service.

The disclosed embodiment include an architecture that allows ASH's such as mobile operators or users to access spectrum they would otherwise not have; it allows the end user to complete their download during congested periods while maintaining high service quality; and it allows the holder of spectrum to be compensated for an otherwise idle asset. Thus, this benefits all parties, while also offloading computational burdens from each party. The process is a compute-intensive optimization problem rather than a communication problem, and is well-suited to the cloud server environment.

FIG. 1 illustrates the overall architecture of a cloud spectrum service system 100 in accordance to an embodiment of the invention. Spectrum service system 100 comprises primary spectrum holder (PSH) 110, alternate spectrum holder 120 (ASH), broker database 130, content provider 140, Multi-mode device (102, 104, 106) having connectivity to a communication network (not shown), each of these features may or may not have direct connectivity to one another, according to various embodiments and system architectures. By way of example, the communication network includes one or more networks such as a wired data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), WiGig, wireless LAN (WLAN), Bluetooth®, Internet Protocol (IP) data casting, satellite, mobile ad-hoc network (MANET), and the like, or any combination thereof.

FIG. 1 shows a system called the Cloud Spectrum Services (CSS) that provides a framework for dynamic spectrum rentals. In this embodiment it is proposed to use the cloud or cloud computing to manage and optimize the complex transactions associated with dynamic spectrum sharing. The centralized access of the cloud enables better operational effectiveness as all client devices such as MMDs will be cloud connected, and able to cease usage of the shared spectrum when the spectrum holder signals its need for access. Spectrum management and load balancing are compute-intensive problems, and the complex transactions can be performed more effectively in the centralized compute-intensive environment of the cloud.

CSS is a dynamic spectrum rental scheme that uses a cloud-based database 125 and optimization engine to allocate available spectrum to client devices such as MMD 102, 104, and 106. The CSS database 125 receives dynamic spectrum availability information from the PSH identifying the primary holder and spectrum asset descriptors such as time, bandwidth, terms of use, price, and location. The availability information may be formatted to any suitable database structure and may be stored by a memory. A tabular form of the spectrum availability information is shown as table 126. The table 126 lists the primary spectrum holder 127 and the spectrum asset descriptors 128. In addition to collecting and organizing spectrum information, database 125 may maintain spectrum rules or inference engine to manage rules for spectrum use, including rules established by the primary spectrum holder 110, government regulations, or agreed upon rules established by the parties. A key part of the CSS concept is that user devices will likely continue to use their operator's primary spectrum to maintain ongoing connectivity; in such cases CSS rental spectrum will be incremental bandwidth for the client devices or for base stations, access points and the like. It is important to note that because the availability and the need for spectrum is communicated to a cloud based spectrum management system it is possible to accomplish and maintain optimal spectrum utilization. Advertising the spectrum for rent will insure that all or a majority of the bandwidth will be carrying communication traffic.

Database broker 130 or database 125 may apportion the spectrum using well know classification algorithms such as binary tree bin packing algorithm. Apportionment of unallocated spectrum may include, for example, removing from the database unallocated or newly available spectrum into segments and arrangement of the segments to fulfill a spectrum request without overlapping with existing spectrum usage. The apportionment algorithm may be designed to identify an optimal configuration of spectrum segments such as time-frequency units within specified constraints. Based on the frequency and time coordinates provided by the primary spectrum holder, the algorithm may create a finite number of "segments" (e.g., unallocated spectrum blocks) and "fill" (e.g., allocate) these bins with "objects" (e.g., complete or partial spectrum requests) so that the number of segments used is maximized or minimized depending on the objective. Using the apportioning algorithm, newly available spectrum, for example, may be efficiently allocated to a number of simultaneous requests for the spectrum.

In the CSS process a cloud spectrum broker 135 acquires information about spectrum asset from the primary spectrum holder 110 to offer to users of spectrum such as content provider 140, client devices such as MMD 106, or alternate spectrum holder 120. Spectrum may be made available from PSH 110 in the form of a spectrum commodity item that may, in turn, form a spectrum offer which is defined in terms of time, bandwidth, location, price, and term of use of the spectrum. The PSH 110 may make multiple offers and for multiple time durations. In turn, the broker may make these spectrum allocations available to interested parties through a push marketing or pull marketing of the advertised spectrum. The broker may provide information back to the license holder about the utilization of the spectrum in the form of one or more acceptance messages. There may be more than one acceptance message for a given spectrum commodity item or associated offer requesting more or less spectrum and possible negotiations as to quality of service or other descriptors that relate to the spectrum.

Database 125 provides for the integration of a geographical area such as a region or state and the current availability of spectrum asset into a single unit. This single instrument may then be used to facilitate and to expedite identification of spectrum, price, bandwidth, and other attributes and, further, to execute the matching of available spectrum for rent to a request for spectrum from a user. Note that database 125 of CSS 100 could also be used to identify holders of certain spectrums and to have the cloud spectrum broker query the identified holder to specific spectrum on behalf of a user As an example of a hypothetical CSS-based dynamic spectrum rental scenario, say a communication Provider Company A has a customer with a MMD such as MMD 106, and that customer wishes to download a video from a content provider that may or may not be affiliated with Company A during peak hours, but Communication Provider's (e.g., Company A) bandwidth threshold at that particular time and cell site would be exceeded. Communication Provider's (e.g., Company A) systems would be programmed to automatically detect this on behalf of the client device such as MMD 106, and request temporary spectrum from the CSS cloud by communicating to cloud spectrum broker 135. CSS would then analyze the request and fill the order from its rental spectrum inventory (e.g. spectrum offered as available for rental by a Primary Spectrum Holder (PSH), say an astronomy agency which only uses its network from 3-4 AM local time). CSS would then send Communication Provider's (e.g., Company A) system the temporary spectrum assignment details making Communication Provider (e.g., Company A) the Alternate Spectrum Holder (ASH) 120. Next, Communication Provider's (e.g., Company A) system sends out programming instructions for the appropriate base station and the client device such MMD 106 to add this incremental band. Then, the user's download of the video proceeds, without the user being aware of these details. This entire process would be completed in a fraction of a second, similar in principle to machine-to-machine HFT (high frequency trading) transactions in securities markets (which also perform compute-intensive optimization operations as part of a sub-second multi-party transaction). It should be understood that the functions of the cloud spectrum broker 135 and cloud spectrum database 125 can be integrated into a single system such as a broker database 130. Qualified participants may search the comprehensive broker database 130 to identify the availability of spectrum and facilities such as antenna towers and the like. This permits any two entities to enter into a direct communication when a match exists between availability, infrastructure, and length of desired use between the parties.

The request for spectrum could also originate from the content provider 140 who wants to ensure their customers get a certain level of service. The Cloud Spectrum Broker can receive request directly from the client such as MMD 102, assuming such operation complies with the terms of use, from the operator or from the content provider 140. It uses the information in the database to perform periodic complex optimizations to maximize spectrum utilization. Availability of spectrum, together with its terms of use conditions, are advertised to the Cloud Spectrum Broker by PSHs and updated periodically.

All devices including primary spectrum holder, alternate spectrum holder, broker database, Multi-mode device, comprise a form of controller or computer having a processor, at least one optional display, a memory, and an operating system, capable of interaction with a user or other devices, and shall include without limitation desktop computers, notebook computers, personal digital assistants (PDAs), smartphone, servers, handheld computers, and similar devices.

Figure 2:
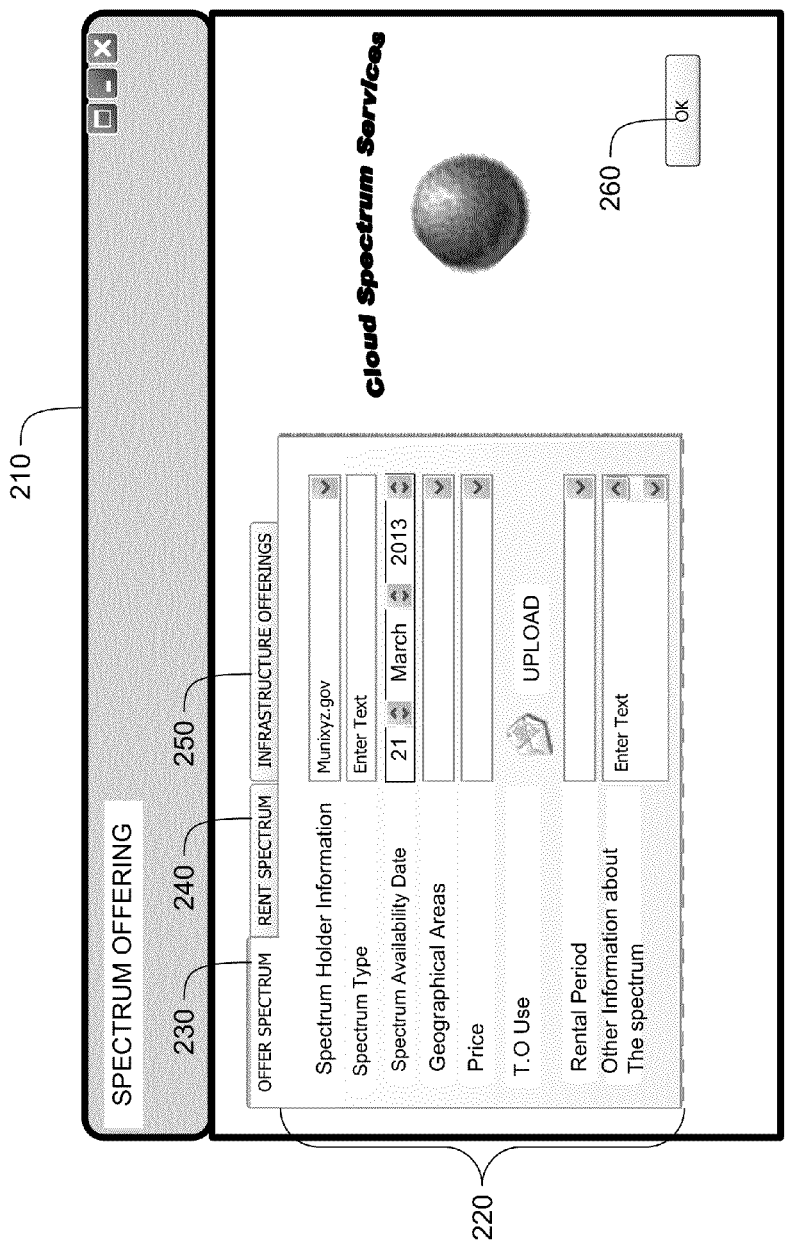
FIG. 2 is a simplified schematic diagram of a spectrum offer description page that may be used by spectrum holders to advertise their spectrum for renting in accordance to an embodiment.

FIG. 2 is a simplified schematic diagram of a spectrum description page 200 that may be used by spectrum holders to advertise their spectrum for renting accordance to an embodiment. The illustrated description page 200 can be used by users wishing to acquire spectrum and by spectrum holders wishing to offer spectrum for rent. Based on the role of the participant a tab would be made available to input information. The input information would identify the PSH making spectrum available for renting and the spectrum asset descriptors such as bandwidth, price, and time. A tab 230 for the primary spectrum holder is shown to offer spectrum for rent, a tab 240 is shown for user that want to rent spectrum, and a tab is shown for infrastructure offerings that can be used by spectrum holder or users. In section 210 the primary spectrum holder can provide identifying information that is used to populate database 125 to advertise their spectrum for rent and provide a centralize facility where users can identify spectrum for rent. FIG. 2 illustrates the page for the primary spectrum holder 110 when a spectrum asset is made available for rent. It is noted that individual pages could be made available to each participant based on the desired role without departing from the scope of the claimed invention.

The tab page to offer spectrum allows a PSH to identify the date for the rent of the targeted spectrum asset. In addition, the tab allows information 220 like pricing, terms of use conditions, and any number of additional parameters to be selected. Other information can include the type of spectrum frequency being offered like broadband personal communications service, the geographic area, the rental period such days, hours, and minutes, and so forth. A free form field is provided for the spectrum holder to provide a description about the spectrum and to include information about the spectrum holder. The primary spectrum holder forwards the filled page to the cloud spectrum broker 135 or cloud spectrum database when the control button 260 ("OK") is selected.

Figure 3:
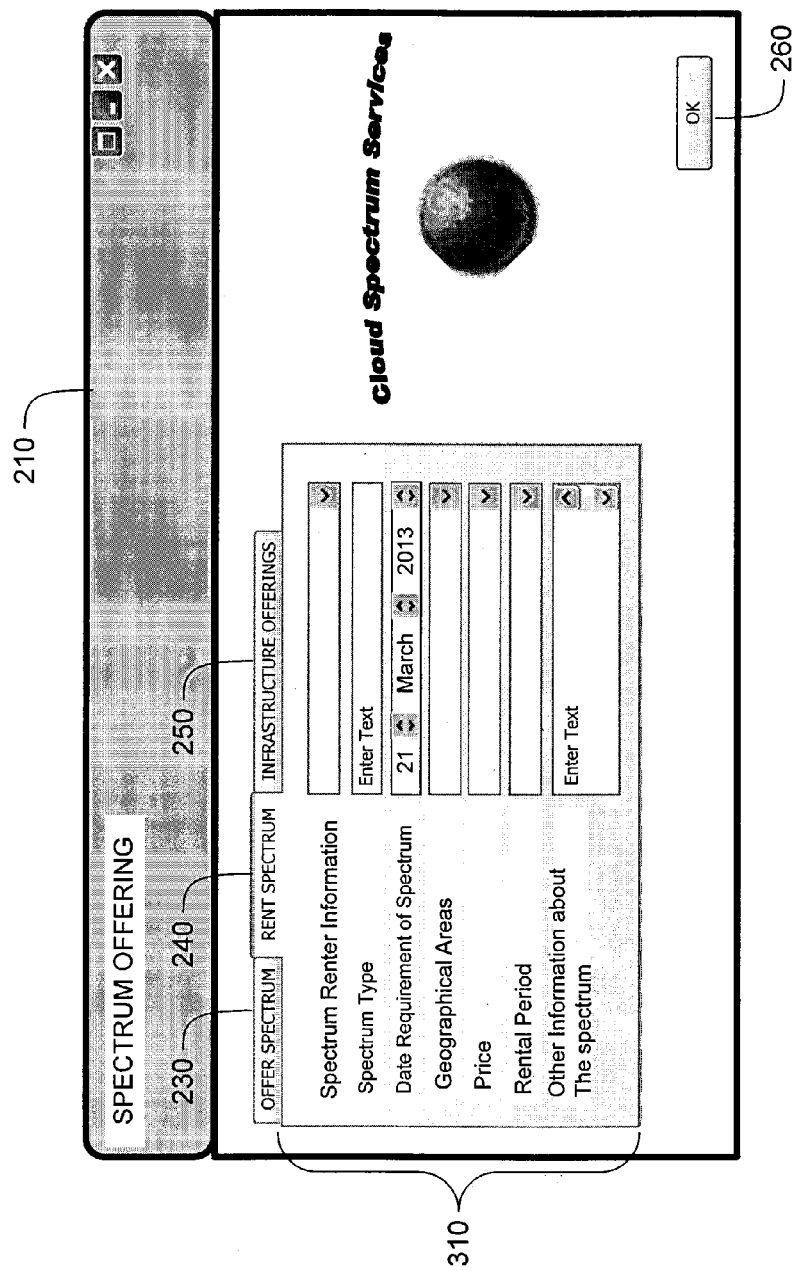
FIG. 3 is a simplified schematic diagram of a description page that may be used by willing spectrum renters such as Multi-mode device (MMD), content provider (CP), Alternate Spectrum Holder (ASH) and the like to request spectrum in accordance to an embodiment.

FIG. 3 is a simplified schematic diagram of a description page 300 that may be used by spectrum renters such as MMDs, CPs, ASHs and the like to request spectrum in accordance to an embodiment. The illustrated information form fields 310 are used to provide information about dynamic spectrum request from users. The spectrum offering description page 210 will highlight the tab 240 for those users that would like to rent a spectrum asset. The information outlined above in FIG. 2 for the spectrum holder is essentially identical to the information needed to match a renter to spectrum holders advertising their spectrum for rent. The illustrated information form fields 310 are used to provide information about dynamic spectrum request to spectrum holders through broker 135 advertising their spectrum for rent. The user forwards the filled page to the cloud spectrum broker 135 when the control button 260 ("OK") is selected for further processing. Using a web browser such as Internet Explorer®, Mozilla Firefox® or Apache Safari®, a spectrum renters such as MMDs, CPs, ASHs and the like can access the description page 300 to request or change one or more spectrum asset offering. The description page may be made available on a graphical user interface (GUI) on a computer that may include a user-controllable pointer. The information transferred through the GUI can be stored in a storage device for later retrieval.

Figure 4:
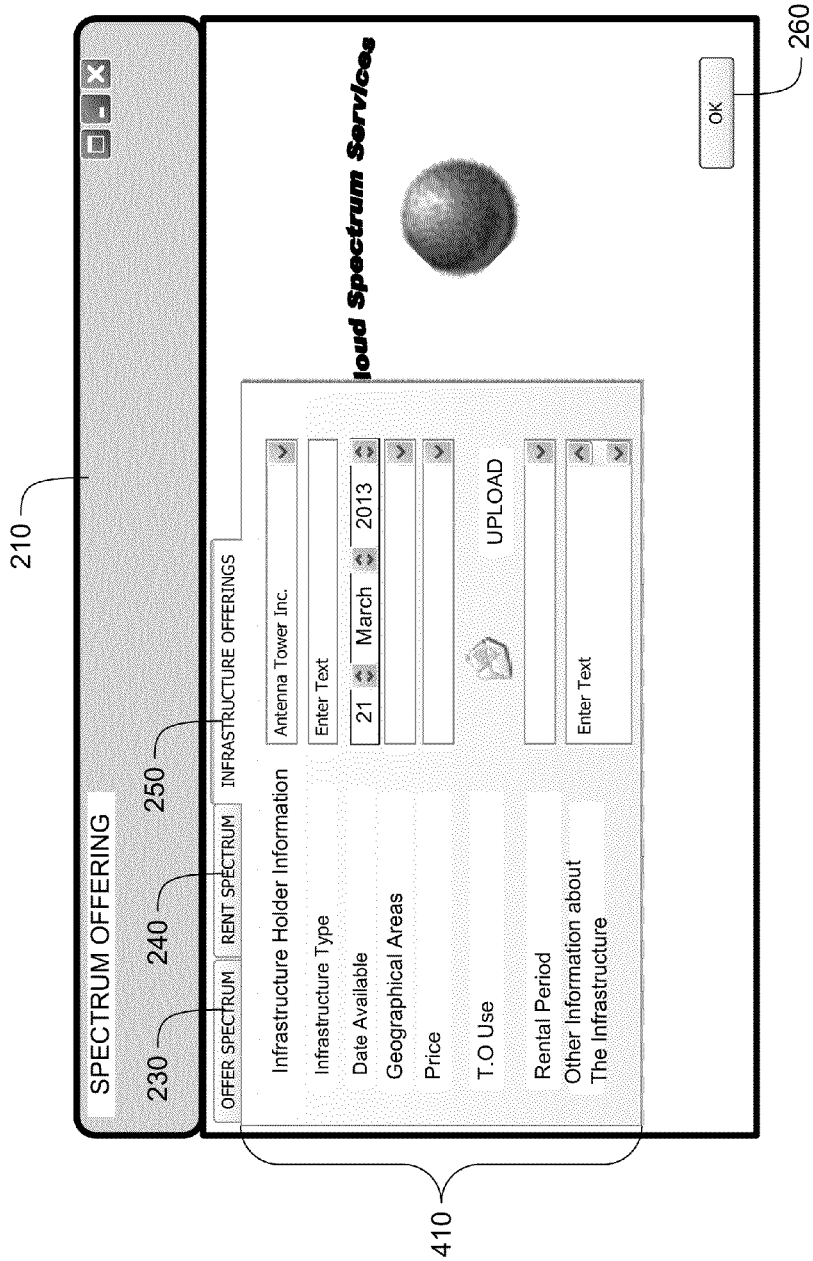
FIG. 4 is a simplified schematic diagram of a description page to offer or request infrastructure to facilitate spectrum services in accordance to an embodiment.

FIG. 4 is a simplified schematic diagram of a description page 400 to offer or request infrastructure to facilitate spectrum services in accordance to an embodiment. An additional representation is provided in conjunction with FIGS. 2-3 to include information from spectrum holders and users about offering or renting infrastructure 410 with respect to a spectrum asset. Using a web browser such as Internet Explorer®, Mozilla Firefox® or Apache Safari®, spectrum holders and users and the like can access the description page 400 to request or change one or more spectrum asset offering. The description page may be made available on a graphical user interface (GUI) on a computer that may include a user-controllable pointer. The information transferred through the GUI can be stored in a storage device for later retrieval.

Figure 5:
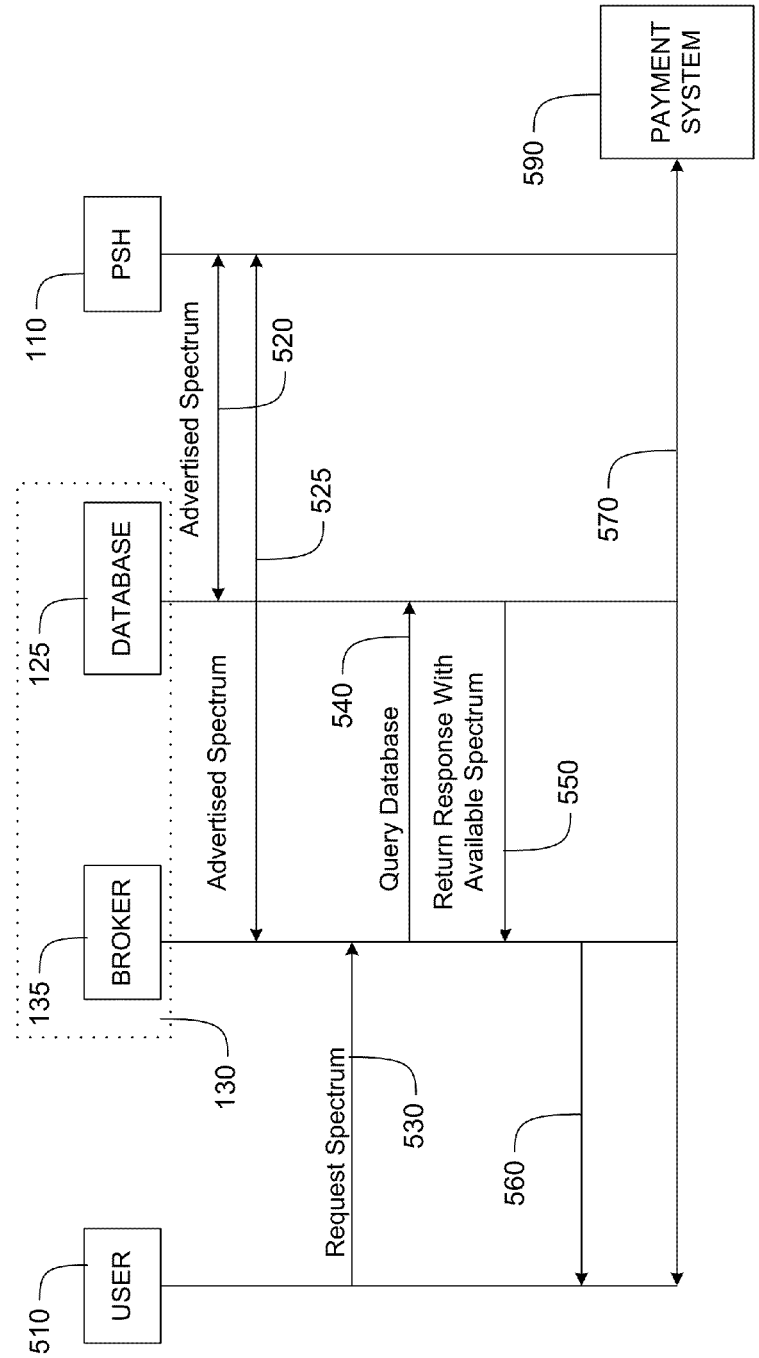
FIG. 5 provides an overview of the concept behind Cloud Spectrum Services (CSS) for dynamic spectrum rentals in accordance to an embodiment.

FIG. 5 provides an overview of the concept behind Cloud Spectrum Services (CSS) for dynamic spectrum rentals in accordance to an embodiment. The overview shows the interaction 500 between a user 510, a broker 135, a database 125, broker database 130, a primary spectrum holder 110, and an optional payment system 590. In the illustrated scenario a primary spectrum holder 110 may have available spectrum that it may wish to advertise for rent. The PSH can upload this information as shown by data flow 520 directly to database 125 or to broker 135 as shown by data flow 525. As noted earlier the functions of the broker 135 and the database can be combined into a single entity called the broker database 130. In this way the database 125 is populated by PSHs advertising their spectrum for rent. Information provided by a PSH can include time, bandwidth, location, and term of use.

Spectrum users are often interested in obtaining access to spectrum for a particular application, such as enterprise applications, two-way communications, point-to-point microwave transmissions, point-to-multipoint communications, cellular communications, mobile broadband communications, and so forth. It will be appreciated that this list is in no way exhaustive of the possible communication applications of potential users. A user 510 requesting spectrum 530 for rent would communicate with the broker and provides the broker with at least one time, bandwidth, location, and term of use. Additionally, through specialized messaging the broker is capable of initiating or placing advertised spectrum with a subset of users. In some instances, the user need not specify the amount of bandwidth that the user is seeking, but this information can be specified if known to the user. The broker 135 takes the request of user 510 and formulates a query 540 that is sent to the database for processing. Once the user's needs are interpreted and the availability spectrum for rent is interpreted, the database may apply algorithms to find a match between the user's spectrum need and the spectrum that is available from a primary spectrum holder 110.

The result of the query which identifies the closest match to the request for spectrum is communicated back to the broker 135 as shown by data flow 550 and then to user 510 as shown by data flow 560. If the spectrum suggestion by the broker, the user invokes a compensation system 590 that may include a transaction database and may match advertised spectrum to payments to satisfy any monetary or non-monetary consideration that is owed based on the placement of a spectrum asset. The payment system may receive compensation information from the broker 135 or from another source, such as the spectrum user 510 or a third party.

Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that performs particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Various processes to support the establishment of an automated spectrum trading and the optimization of spectrum allocation have been described. Using the disclosed approach, efficient and productive use of spectrum may be made, while minimizing the procedural and transactional burdens on spectrum holders or spectrum users. Although the above description may contain specific details, they should not be construed as limiting the claims in any way. Other configurations of the described embodiments of the disclosure are part of the scope of this disclosure. For example, the principles of the disclosure may be applied to each individual user where each user may individually deploy such a system. This enables each user to utilize the benefits of the disclosure even if any one of the large number of possible applications do not need the functionality described herein. In other words, there may be multiple instances of the components each processing the content in various possible ways. It does not necessarily need to be one system used by all end users. Accordingly, the appended claims and their legal equivalents should only define the disclosure, rather than any specific examples given.

We claim:

1. A dynamic cloud based spectrum management platform, comprising:
    a cloud-based database operable to store information associated with at least one spectrum asset, wherein the stored information includes dynamic spectrum availability information from spectrum holders advertising their spectrum for rent, wherein the cloud-based database is further operable to apportion the spectrum for rent in response to a request for spectrum from a user;
    wherein ongoing connectivity for a base station or multimode device (MMD) is maintained by an operator of a fixed network and the request for spectrum is an incremental bandwidth;
    wherein an operator or content provider can engage in negotiation with a spectrum broker to meet an actual or future incremental bandwidth need for the multi-mode device (MMD).

2. The dynamic cloud based spectrum management platform in accordance to claim 1, wherein the user is one or more content providers, client device, operator of a fixed network, base station, cluster of client devices, or a combination thereof.

3. The dynamic cloud based spectrum management platform in accordance to claim 1, wherein the dynamic spectrum availability information is at least one of time, bandwidth, price, location, terms of use conditions, or a combination thereof.

4. The dynamic cloud based spectrum management platform in accordance to claim 3, further comprising:
    a broker apparatus to match spectrum for rent with a request for spectrum from a user.

5. The dynamic cloud based spectrum management platform in accordance to claim 4, wherein the broker apparatus is capable of receiving request for spectrum directly from the user.

6. The dynamic cloud based spectrum management platform in accordance to claim 5, wherein the broker apparatus uses the store information associated with at least one spectrum asset to perform periodic optimizations to maximize spectrum utilization among wireless communication systems.

7. The dynamic cloud based spectrum management platform in accordance to claim 6, wherein the spectrum for rent and terms of use conditions are periodically advertised to the broker by the spectrum holder and wherein the broker is capable of reserving a set of advertised spectrum for selected users.

8. A method to allocate spectrum, comprising:
maintaining a cloud-based database operable to store information associated with at least one spectrum asset, wherein the stored information includes dynamic spectrum availability information from spectrum holders advertising their spectrum for rent;
apportioning the spectrum for rent in response to a request for spectrum from a user;
wherein ongoing connectivity for a base station or multimode device (MMD) is maintained by an operator of a fixed network and the request for spectrum is an incremental bandwidth;
wherein an operator or content provider can engage in negotiation with a spectrum broker to meet an actual or future incremental bandwidth need for the multi-mode device (MMD).

9. The method in accordance to claim 8, wherein the user is one or more content providers, client device, operator of a fixed network, base station, cluster of client devices, or a combination thereof.

10. The method in accordance to claim 8, wherein the dynamic spectrum availability information is at least one of time, bandwidth, price, location, terms of use conditions, or a combination thereof.

11. The method in accordance to claim 10, further comprising:
maintaining a broker apparatus to match spectrum for rent with a request for spectrum from a user.

12. The method in accordance to claim 11, wherein the broker apparatus is capable of receiving request for spectrum directly from the user.

13. The method in accordance to claim 12, wherein the broker apparatus uses the store information associated with at least one spectrum asset to perform periodic optimizations to maximize spectrum utilization among wireless communication systems.

14. The method in accordance to claim 13, wherein the spectrum for rent and terms of use conditions are periodically advertised to the broker by the spectrum holder and wherein the broker is capable of reserving a set of advertised spectrum for selected users.

15. A non-transitory machine-accessible medium that provides instructions, which when accessed, cause a machine to perform operations comprising:
maintaining a cloud-based database operable to store information associated with at least one spectrum asset, wherein the stored information includes dynamic spectrum availability information from spectrum holders advertising their spectrum for rent;
apportioning the spectrum for rent in response to a request for spectrum from a user;
wherein ongoing connectivity for a base station or multimode device (MMD) is maintained by an operator of a fixed network and the request for spectrum is an incremental bandwidth;
wherein an operator or content provider can engage in negotiation with a spectrum broker to meet an actual or future incremental bandwidth need for the multi-mode device (MMD).

16. The non-transitory machine-accessible medium in accordance to claim 15, wherein the user is one or more content providers, client device, operator of a fixed network, base station, cluster of client devices, or a combination thereof.

17. The non-transitory machine-accessible medium in accordance to claim 15, wherein the dynamic spectrum availability information is at least one of time, bandwidth, price, location, terms of use conditions, or a combination thereof.

18. The non-transitory machine-accessible medium in accordance to claim 17, further comprising said instructions causing said machine to perform operations further comprising maintaining a broker apparatus to match spectrum for rent with a request for spectrum from a user.

19. The non-transitory machine-accessible medium in accordance to claim 18, wherein the broker apparatus is capable of receiving request for spectrum directly from the user.

20. The non-transitory machine-accessible medium in accordance to claim 19, wherein the broker apparatus uses the store information associated with at least one spectrum asset to perform periodic optimizations to maximize spectrum utilization among wireless communication systems;
wherein the spectrum for rent and terms of use conditions are periodically advertised to the broker by the spectrum holder; and
wherein the broker is capable of reserving a set of advertised spectrum for selected users.

\* \* \* \* \*